United States Patent [19]

Einhorn et al.

[11] Patent Number: 4,753,506
[45] Date of Patent: Jun. 28, 1988

[54] OFF AXIS OPTICAL COMMUNICATION SYSTEM

[75] Inventors: Arthur J. Einhorn, Los Angeles; Richard T. Luke, Rolling Hills Estates; Emanuel Marom, Canoga Park, all of Calif.

[73] Assignee: Hughes Aircraft Company, Los Angeles, Calif.

[21] Appl. No.: 902,824

[22] Filed: Sep. 2, 1986

[51] Int. Cl.$^4$ ............................ G02B 6/26; H01J 5/16; G02F 1/00
[52] U.S. Cl. ............................ 350/96.15; 350/96.16; 350/96.20; 350/169; 250/227; 455/606; 455/610; 455/612; 244/158 R; 244/165
[58] Field of Search .............. 350/96.10, 96.15, 96.16, 350/96.20, 96.29, 96.30, 169; 250/227, 551, 552, 553, 233; 310/232; 455/606, 610, 612, 600; 244/128 R, 165

[56] References Cited

U.S. PATENT DOCUMENTS

| 3,190,131 | 6/1965 | Daubert, Jr. | 74/45.1 |
|---|---|---|---|
| 3,285,533 | 11/1966 | Jernigan, Jr. | 244/1 R |
| 3,922,063 | 11/1975 | Marrone | 350/96.10 X |
| 4,027,945 | 6/1977 | Iverson | 350/96.20 X |
| 4,109,997 | 8/1978 | Iverson | 350/96.10 X |
| 4,124,272 | 11/1978 | Henderson et al. | 350/96.21 |
| 4,165,913 | 8/1979 | Fitch | 350/96.15 |
| 4,166,959 | 9/1979 | Ivie | 250/227 X |
| 4,175,230 | 11/1979 | Richards et al. | 455/612 X |
| 4,178,515 | 12/1979 | Tarasevich | 250/551 |
| 4,460,242 | 7/1984 | Birch et al. | 350/96.20 |
| 4,466,695 | 8/1984 | Kruger | 350/96.20 |
| 4,711,516 | 12/1987 | Graber | 350/96.15 |

FOREIGN PATENT DOCUMENTS

| 39475 | 11/1981 | European Pat. Off. | 350/9620 |
|---|---|---|---|
| 122890 | 10/1984 | European Pat. Off. | 224/158 R |
| 60-218935 | 1/1985 | Japan | 455/600 X |
| 2074313 | 10/1981 | United Kingdom | 250/227 |

OTHER PUBLICATIONS

Dorsey, "Fiber Optic Rotary Joints-A Review" IEEE Trans on components, Hybrids and manufact. Tech. vol. CHMT-5, 3/82, pp. 37-41.
"Optical sensing for gyro Gimbal pickoff" U.S. Army Mat. Devel. Report No. T-79-81, 2/82, 1 pg.

Primary Examiner—William L. Sikes
Assistant Examiner—Brian M. Healy
Attorney, Agent, or Firm—S. M. Mitchell; M. J. Meltzer; A. W. Karambelas

[57] ABSTRACT

An improved optical rotary joint is achieved by transmitting information in the form of an optical signal from a part of the de-spun portion outside the rotational axis to create on the spun portion, or vice versa, 360° about the rotational axis, a continuous communication path having a configuration described by a series of overlapping elliptical areas. The detection area on the spun portion is less than that of the detection path thereby providing continuous optical communication with the transmitted optical signal.

34 Claims, 4 Drawing Sheets

OFF AXIS OPTICAL COMMUNICATION SYSTEM

BACKGROUND OF THE INVENTION

1. Field of the Invention

The present invention relates generally to the field of optical communication and, more specifically, to an improved optic rotary communication system that provides optical communication offset from the rotary axis on applications such as spacecrafts and gimbals.

2. Description of Related Art

There has been an increase in the past years of optical communication systems such as the use of fiber optic signal transmission. One problem confronted over the years has been the effective transmission of optical signals onto or off of relatively rotating devices in what has been referred to as optical rotary joints. This problem exists for example in the contexts of spacecraft, gimbals, or missile heads where one portion rotates relative to the other portion. In those situations, like others, the design of communication apparatus commonly includes a rotating device that lies co-axial with a non-rotating device and an axial portion intermediate the rotating and non-rotating devices.

Some solutions to the problem have included converting the optical signal to an electrical one at the input to a rotary brush-and-slip ring interconnector and then converting the signal back to an optical signal at the output of the interconnector. This, however, introduces problems of wear and contact integrity with corresponding signal degradation, limited bandwidth, loss of signal, and increased noise by changing from optical to electrical and vice versa. Beam waveguides have also been utilized but have resulted in problems of mirror misalignment and bulky sized components which are directly related to the size of the wavelengths.

One design solution has suggested the use of co-axial optical cables like that described in Marrone, Winch Mounted Optical Data Transmission Cable With Fluid Coupling, U.S. Pat. No. 3,922,063, wherein interfacing axially aligned optical windows are connected to the ends of optical cables. Positioned between the optical windows is an optically transparent fluid having the same optical index of refraction as the fiber optic transmission path to thereby affect an optical coupling between the two cables. Another example of co-axial coupling is taught by Henderson et al. Rotary Fiber Optical Wave Guide Coupling, U.S. Pat. No. 4,124,272. A pair of axially aligned ferrules hold two ends of fiber optic cables therein. The ferrules are held in an axial position by abutment at their inner ends in a pair of alignment caps mounted in two relatively rotatable housing members. A pair of retaining sleeves screwed into the housing members cooperate with the ferrules to obtain radial and axial positioning.

However, co-axial cable designs have problems. The movement of the rotating member is often limited. The required components are often heavy in weight and large in size. One major problem encountered in the co-axial cable design has been the misalignment of the ends of the optical cables which causes signal attenuation. The associated problems of lateral misalignment, end separation, and angular separation in the context of co-axial cables is further described in Dorsey, Fiber Optical Rotary Joints—A Review, *I.E.E.E. Transactions On Components, Hybrids, and Manufacturing Technology*, Vol. CHMT-5, No. 1, March 1982.

Other optical rotary joint designs have included apparatus that transmits the optical signal outside of the rotary axis. For example, Fitch, Rotary Optical Coupler, U.S. Pat. No. 4,165,913 describes an apparatus that does not transmit the signal between the interfacing surfaces of the rotating and non-rotating members. Instead, an optical fiber is wrapped around the exterior of a surface of the rotating member that does not interface with the non-rotating member. The surface of the optical fiber is roughened to permit the optical signal to be transmitted laterally through the fiber wall. A stationary light detector positioned outside of the rotating member and adjacent, the optical fiber receives the signal being transmitted through the fiber wall as the rotating member rotates. A major problem with this technique is that scattering light out the sides of the fiber is very inefficient.

Another optical rotary joint that provides for optical transmission outside of the rotary axis is shown in Iverson, Optical Sliprings, U.S. Pat. No. 4,027,945. A signal is transmitted into the rotating member through fiber bundles which terminates at the surface interfacing the non-rotating member in concentric, annular bundle ends. At the interfacing surface of the non-rotating member, the signal is transmitted from the rotating member to axially aligned, corresponding concentric annular bundle ends. Opaque bundle coverings or cladding within the rotating and non-rotating members serve to isolate the signals in each channel and maintain bundle shape. It is evident, however, that alignment problems can still present a significant problem in the bundle design, as in the above co-axial cable designs.

As can be appreciated the problems of a hostile environment and weight limitations in a space application provide even greater problems. Accordingly, there is still a requirement in the prior art to provide a relatively light weight optical communication joint for application in outer space and other environments.

SUMMARY OF THE INVENTION

One object of the present invention is to provide an improved fiber optical rotary joint.

Another object of the present invention is to provide an optical rotary joint that transmits an optical signal between the interfacing surfaces of rotating and non-rotating members outside of the rotating axis to thereby allow the axial portion between the two members to remain free for other purposes.

A further object of the present invention is to minimize the need for precise axial alignment between the rotating and non-rotating members.

An even further object of the present invention is to provide an optical rotary joint that is not restricted in the amount by which the rotating member can rotate nor by the speed or acceleration of it.

A still further object of the present invention is to provide an optical communication transmission system for use on spacecraft with relatively rotatable component parts that is lightweight.

These and other objects are particularly accomplished by providing on one of the interfacing surfaces of the rotating and non-rotating members a transmitter to produce an optical signal. The transmitter is positioned off the rotational axis and the optical signal is directed towards the other interfacing surface in a cone-shaped communication path that diverges away from the transmission point. In one embodiment of the invention, only one such communication path is created. In another preferred embodiment of the invention, a plurality of communication paths are created. In either embodiment, the communication path(s) provide a detection path on the other interfacing surface 360° around the rotational axis. The detection areas of one or more detectors for receiving the signal will lie within the detection path and constitute a total area smaller than the total area of the detection path.

Other object of the present invention will be evident from an examination of the following drawings, specifications, and claims hereto.

DESCRIPTION OF THE PREFERRED EMBODIMENTS

Figure 1:
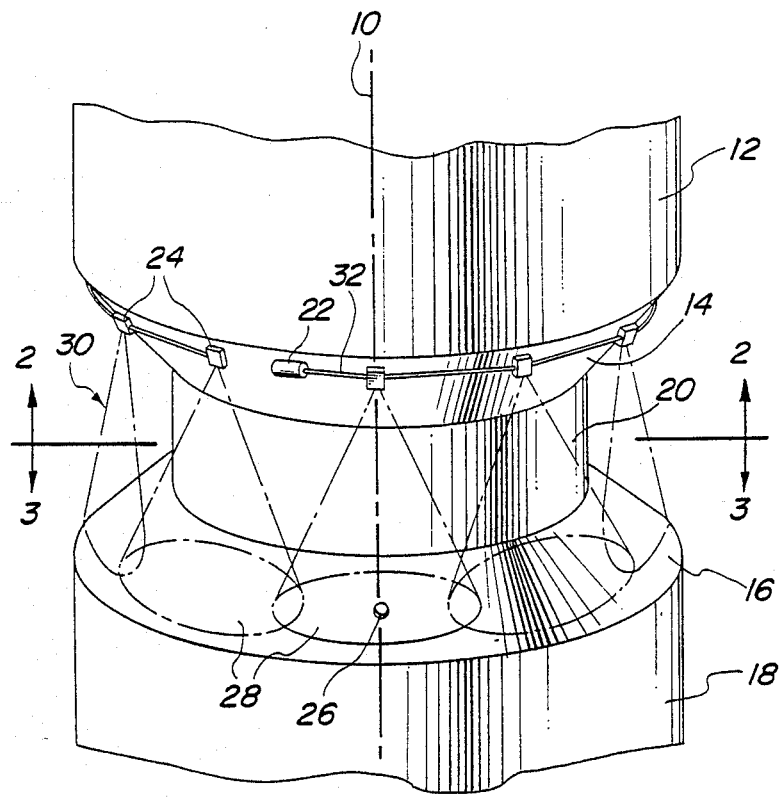
FIG. 1 shows a partial side perspective elevational view of a first preferred embodiment of the present invention.

The following description is provided to enable any person skilled in the electrical and fiber optic fields to make and use the present invention and sets forth the best mode contemplated by the inventors of carrying out their invention. Various modifications, however, will remain readily apparent to those skilled in the arts, since the generic principles of the present invention have been defined herein specifically to provide an improved optical rotary joint.

Two preferred embodiments of the present invention hereinafter described are disclosed in the context of a spacecraft communication system. However, this is not meant to limit the invention's application to spacecraft. In a first preferred embodiment (FIG. 1), an axial portion 20 of the spacecraft is a cylindrical shaped element whose longitudinal axis is positioned on a rotational axis 10. A de-spun portion 12 of the spacecraft is also a cylindrical shaped element having a diameter of approximately ten to fourteen feet and positioned co-axial to the axial portion 20. The diameter of the de-spun portion 12 is greater than the diameter of the axial portion 20. One end of the de-spun portion 12 includes a conically shaped receiving area or second communication surface 14 fixed to one end of the axial portion 20. The second communication surface 14 extends from the entire circumferential edge of the end of the de-spun portion 12 obliquely towards the end of the axial portion 20 to which it is joined.

Similarly, a spun portion 18 is configured and dimensioned like the de-spun portion 12 and is positioned co-axial to the axial portion 20 on the end of the axial portion 20 opposite the de-spun portion 12. The spun portion 18 also includes a transmitting area or a first communication surface 16, similiar to that of the second communication surface 14, and positioned so that such two surfaces interface each other at a distance of less than two feet. However, unlike the de-spun portion 12, the spun portion 18 rotates about the axial portion 20 on the rotational axis 10. It should be noted here that the invention will work with a separation distance between the two surfaces of much greater than two feet.

Although the de-spun portion 12 and the spun portion 18 are preferably cylindrical shaped elements in this embodiment, the present invention contemplates that other configurations would be suitable. Likewise, although the second communication surface 14 and the first communication surface 16 are shown as conical surfaces disposed in an oblique fashion with respect to the axial portion 20, other configurations are contemplated by the present invention.

Through apparatus not shown, analog or digital signals are sent to a transmitter 22 that is stationarily fixed on the exterior side of the second communication surface 14 between the edges thereof which are defined by the circumference of the de-spun portion 12 and the relatively smaller circumference of the axial portion 20. The transmitter 22 is either a semiconductor laser or light emitting diode and is preferably light in weight, e.g. 5 oz., and requires a maximum power of 6 watts for a complete transmitter, such as that manufactured by General Optronics, model GO-ANA. Also suitable is the 6 GHz semiconductor laser by Ortel Corporation, model LDS3-DMF. Other devices well known in the art which produce an optical signal capable of carrying information are also contemplated. Any desirable frequency may be used for the input signal as long as it falls within the bandwidth capability of transmitter 22. The transmitter 22 generates an optical signal 32 which, as discussed below, moves almost 360° about the rotational axis 10 and along the exterior side of the second communication surface 14.

Associated with the transmitter 22 is a collimator element or prism (not shown) that collimates the optical signal 32 being generated from the transmitter 22. Collimator elements, like those utilized in the present invention, are conventional in the art and are often utilized with a light emitting diode (LED) or a semiconductor laser that commonly generate a diverging beam in a configuration having an elliptical cross-section, which configuration results from the geometry of the device. Such a beam will thus have a non-uniform energy distribution. By directing the beam through prisms well known in the art, the configuration of the beam can be changed to a circular shape to thereby produce a more uniform energy distribution than would otherwise exist and enable the energy in the beam to be split equally in the manner described below. One such prism is shown for example in Yonezawa et al. "Optical Information Processor With Prismatic Correction Of Laser Beam Shape," U.S. Pat. No. 4,333,173.

In this embodiment of the present invention, the transmitter 22 may also be associated with a polarization element or prism (not shown) to polarize the optical signal 32 and thereby prevent "back talk," i.e., interference with the laser output caused by reflected laser energy. Polarization elements are also well known in the art and commonly incorporate high and low refractive index material forming quarter wavelength coatings on a prism. For example, this is taught in the disclosures of Southwell, "High Reflectivity Coated Mirror Producing 90 Degree Phase Shift," U.S. Pat. No. 4,312,570 and Eastman et al., "Reflective Polarization Retarder and Laser Apparatus Utilizing Same," U.S. Pat. No. 4,084,883.

Figure 2:
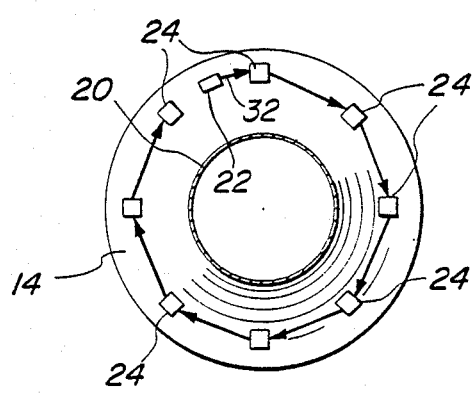
FIG. 2 is a reduced sectional view taken about line 2—2 of FIG. 1.

After passing through the collimator and polarization elements, the optical signal 32 is directed, through a plurality of beam splitters 24. In the preferred embodiment, eight beam splitters 24 are provided and positioned on the second communication surface 14 equidistant radially from one another at a radial distance measured from the rotational axis 10 which is approximately equal to the radial distance of the transmitter 22 from the rotational axis 10. The beam splitters 24 are also equidistant circumferentially about a circumference measured by such radial distance, as in FIG. 2. The optical signal 32 moves in the counter clockwise direction (FIG. 2). It first passes through the first beam splitter 24, then the second beam splitter 24 and then sequentially continuing through the remaining beam splitters 24 so that all eight beam splitters 24 are simultaneously illuminated at a given time. Each beam splitter 24 diverts approximately one-eighth of the optical signal 32 towards the first communication surface 16 minus the energy that is lost in the beam splitters. The beam splitters 24 are of any appropriate design that is conventional in the art, some of which are disclosed in Sawamua, et al. "Low Polarization Beam Splitter," U.S. Pat. No. 4,367,921 and MacNeille, "Beam Splitter," U.S. Pat. No. 2,403,731. In the preferred embodiment, the optical signal 32 passes through eight beam splitters 24. However, more or less than eight beam splitters 24 are contemplated, as will be evident from the specifications below.

Figure 4:
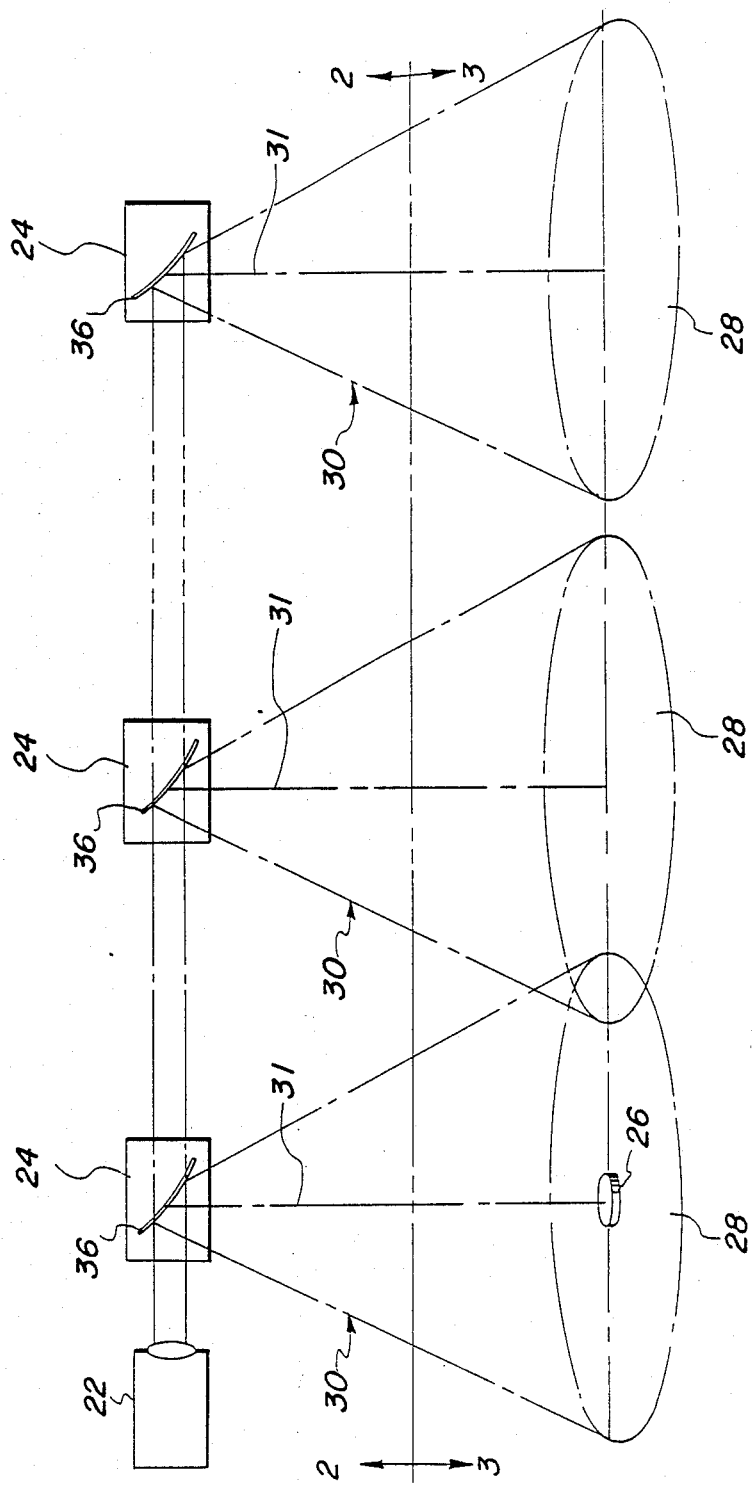
FIG. 4 is a partial exploded view of FIG. 1 depicting some of the beam splitters and communication paths.

As shown in FIG. 4, each beam splitter 24 is associated with a mirror 36 that creates a diverging beam in the form of a communication path 30, throughout which one-eighth of the power of the optical signal 32 is transmitted to impinge the first communication surface 16. The mirror 36 is conventional in the art, such as that disclosed in Ferguson, "Wavey Mirror Transmitter Optics," U.S. Pat. No. 4,173,036. As taught by Ferguson, the mirror 36 is configured to reflect that part of optical signal 32 diverted by the respective beam splitter 24 to thereby create the communication path 30 that is elliptical and cone-shaped. The apex of the communication path 30 is at the respective beam splitter 24 and an elliptical area 28 is defined at the end of the communication path 30 opposite the beam splitter 24. An optical axis 31 of each communication path 30 extends from the apex, through the center of the path, and to the elliptical area 28. Each optical axis 31 of each communication path 30 is generally parallel to the rotational axis 10 and of a length approximately equal to P, as indicated in the following equation. The angle of divergence of the optical signal 32 in each communication path 30 is approximately defined by the angle α in the following equation:

$$\alpha = \frac{2\pi R}{NP}$$

where
P = the perpendicular distance from the transmitter 22 to the first communication surface 16
N = the number of beam splitters 24
R = the radial distance from the rotational axis 10 to the center of the detection area of a detector 26 (FIG. 1).

A mirror 36 is associated with each beam splitter 24 to simultaneously create eight communication paths 30 as shown in FIGS. 1 and 4.

Figure 3:
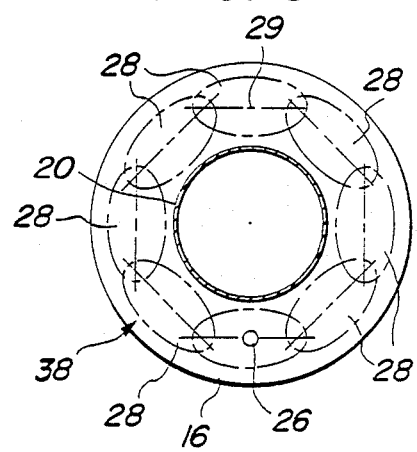
FIG. 3 is a reduced sectional view taken about line 3—3 of FIG. 1.

Each elliptical area 28 of each communication path 30 includes a major axis 29 which extends between the two ends of the elliptical area 28 having a distance greater than between any other two ends thereof and perpendicularly intersects the optical axis 31. Each major axis 29 is of a length approximately equal to one another and approximately equal to that distance which separates each beam splitter 24 circumferentially. Each major axis 29 lies tangential to the circumference of an imaginary circle whose radius is approximately equal to the radial distance of the beam splitters 24 from the rotational axis 10 whereby the ends of each major axis 29 intersect at oblique angles with the ends of the immediately adjacent major axes 29. Each elliptical area 28 thereby partially overlaps the immediately adjacent elliptical area 28 on either of its sides. The area of overlap of each elliptical area 28 results from the particular positioning of each beam splitter 24 and configuration of each mirror 36. As the optical signal 32 is transmitted through the eight communication paths 30 and impinges the first communication surface 16 in the defined overlapping elliptical areas 28, a detection path 38 is thereby created for a full 360° about the rotational axis 10 on a part of the first communication surface 16 (FIG. 3). The detection path 38 describes an area through which the energy from the optical signal 32 is generally equally distributed except for the overlapped positions.

A single detector 26 is stationarily fixed to the first communication surface 16 within the detection path 38 and thereby moves 360° about the rotational axis 10 and through the detection path 38 generally along each major axis 29 as the spun position 16 rotates. The detector 26 detects the optical signal 32 throughout a detection area of a size that is substantially smaller than any one elliptical area 28. Preferably, the detector 26 is lightweight and has a detection area of 1 to 10 mm$^2$, like that manufactured by RCA, model RCA 86003E, or model RCA 30902 E that has a wider band of detection. The detector 26 can be of other appropriate conventional devices in the art that are capable of receiving the optical signal 32.

As can be seen, continuous optical communication of the optical signal 32 between the de-spun portion 12 and the spun portion 18 is achieved. The transmitter 22 creates the optical signal 32 that will move counterclockwise around the second communication surface 14. After passing through the collimator and polarization elements, the optical signal 32 is apportioned equally by the eight beam splitters 24 using appropriate transmitted to reflected beam ratios. Each beam splitter 24 will then be simultaneously illuminated. Each portion of the optical signal 32 from the beam splitters 24 is directed towards the first communication surface 16 by the mirrors 36 associated with the beam splitter 24. Eight communication paths 30, throughout which the optical signal 32 travels, are created. The aggregation of the elliptical areas 28 of each communication path 30 produces a continuous detection path 38 on the first communication surface 16. As the first communication surface 16 rotates, the detector 26 continually passes through the detection path 38 generally along each major axis 29. Since the elliptical areas 28 which form the detection path 38 each contain sufficient energy at all points therein for detection by the detector 26, the optical signal 32 is continuously transmitted and received between the second communication surface 14 and the first communication surface 16.

Figure 5:
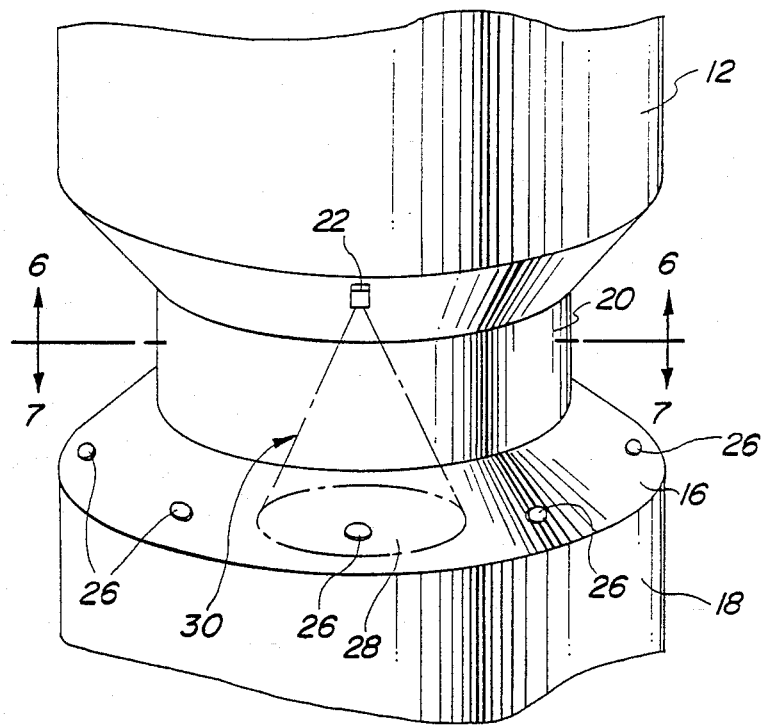
FIG. 5 shows a side, elevation view of a second preferred embodiment of the present invention.
Figure 6:
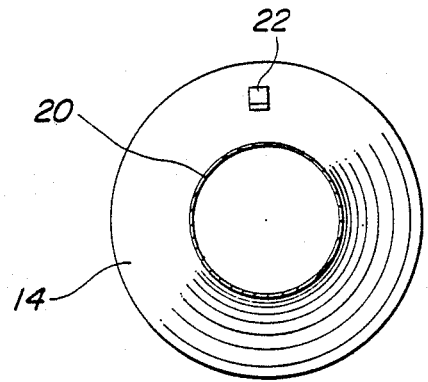
FIG. 6 is a reduced sectional view taken about line 6—6 of FIG. 5.
Figure 7:
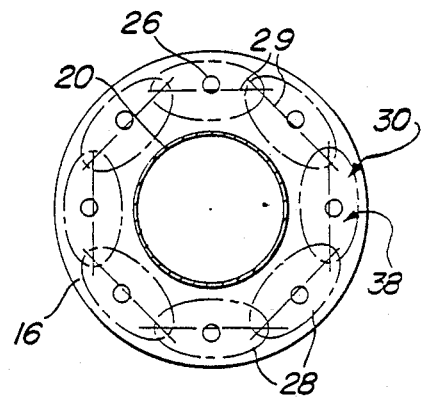
FIG. 7 is a sectional view taken about line 7—7 of FIG. 5 (on a smaller scale).
Figure 8:
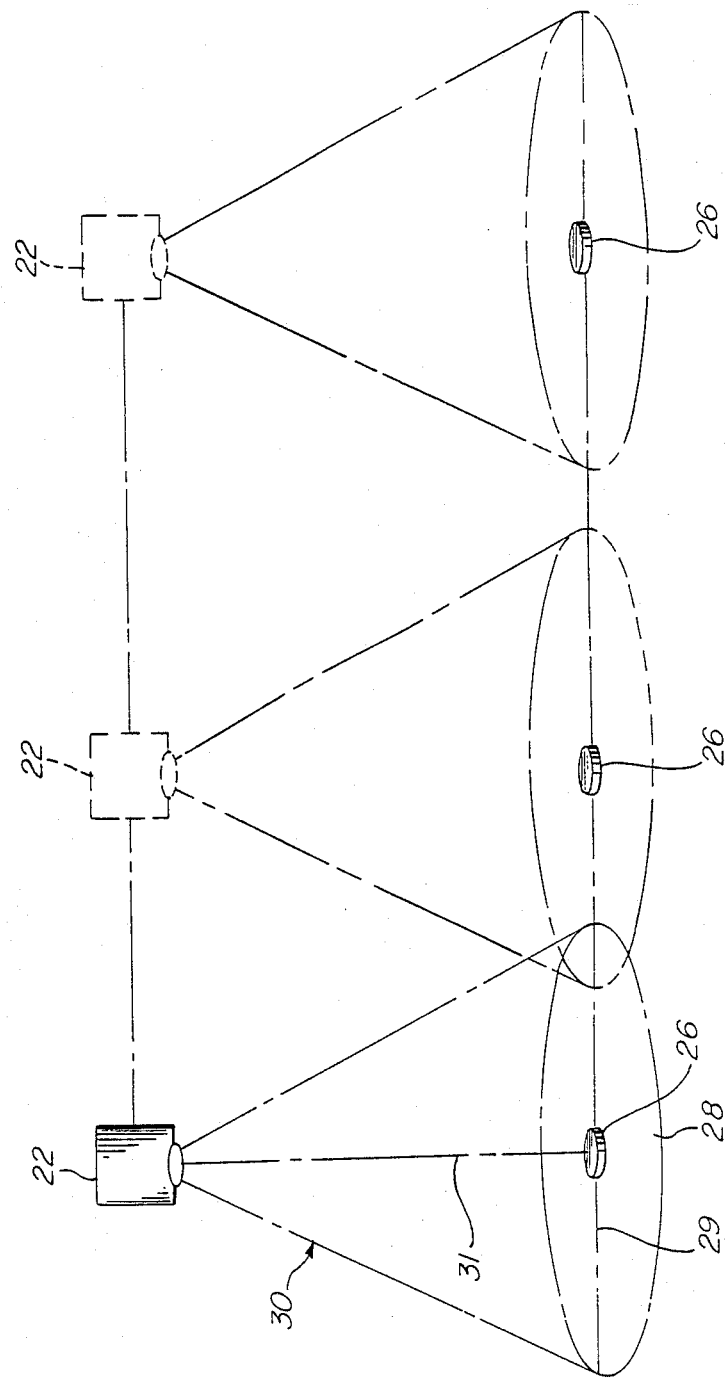
FIG. 8 is a partial exploded view of FIG. 5 depicting a transmitter and communication paths.

Also in the context of a spacecraft, in a second preferred embodiment of the present invention, the de-spun portion 16, second communication surface 14, spun portion 18, first communication surface 16, and axial portion 20 are provided as in the embodiment above. The transmitter 22, like that in the first preferred embodiment, is stationarily fixed on the second communication surface 14. However, unlike the first preferred embodiment, no beam splitters 24 are utilized and thus no collimator elements, like those above, are required. Rather, one mirror and one polarization element as above are associated with the transmitor 22 to create one communication path 30 having the elliptical area 28 at the first communication surface 16 (FIG. 5). The optical axis 31 (FIG. 8) of the communication path 30 is generally parallel to the rotational axis 10. Similar to that in the first preferred embodiment, the continuous detection path 38 is thereby created about the rotational axis 10 on a part of the first communication surface 16, as shown in FIGS. 7 and 8. The detection path 38 is generally defined by a rotation of the elliptical area 28 which will either be in direct communication with a detector 26 or will partially overlapp two spaced detectors. Although only one communication path 30 is created in this preferred embodiment, the rotation of the spun portion 18 relative to the stationary elliptical area 28 creates the continuous detection path 38, similar to that in the first preferred embodiment as far as providing a continuous communication link.

As shown in FIG. 7, as compared to the single detector 26 in the first preferred embodiment, eight detectors 26 are stationarily fixed on the first communication surface 16, a common radial distance from the rotational axis 10 and equidistant circumferentially about a circumference defined by the radial distance. The radial distance is approximately equal to the radial distance from the rotational axis 10 to the transmitter 22. The circumferential distance by which each detector 26 is separated from one another is approximately equal to the length of each major axis 29, which is approximately equal to those in the first embodiment. The size of the detection area of each detector 26 is also like that in the first embodiment. As the spun portion 18 rotates the detectors 26 move through the elliptical area 28. Consequently, at least one detector 26 will at all times be positioned in the elliptical area 28. Continuous transmission and detection of the optical signal 32 between the second communication surface 14 and the first communication surface 16 is thereby achieved.

As the optical signal 32 is transmitted from the transmitter 22, the mirror 36 shapes the optical signal 32 into the single communication path 30. The mirror 36 also directs the elliptical area 28 of the communication path 30 onto the first communication surface 16 so that the major axis 29 intersects or is near one of the detectors 26. As the result of the rotation of the spun portion 18, the eight detectors 26 fixed on the first communication surface 16 rotate 360° about the rotational axis 10 and move through the detection path 38 whereby at least one detector 26 is always in the elliptical area 28. Continuous detection of the optical signal 32 is thus achieved.

It is also possible with the present invention to provide a filter or beam splitter so that a different wavelength will be transmitted at each optical path, thereby allowing for a multiple channel communication system. Appropriate signal processing to coordinate the receipt of the respective wavelengths with the detectors would require appropriate electronic or optical filters before or after the detectors.

As can be seen, the first preferred embodiment and the second preferred embodiment are essentially equivalent to each other in transmitting a continuous communication path with low noise. The eight beam splitters 24 in the first preferred embodiment are the eight detectors 26 in the second preferred embodiment. The single detector 26 in the first preferred embodiment is the single transmittor 22 in the second preferred embodiment. In addition, the present invention contemplates that the transmission and reception elements in each embodiment can be included on both the first communication surface 14 and the second communication surface 16 so that transmission and reception can move in both directions between such surfaces.

The specifications above describe only two preferred embodiments of the present invention, and it is contemplated that various modifications to the above can be effected but nevertheless come within the scope of the present invention as defined by the claims.

What is claimed is:

1. An improved optical rotary joint having a spun portion positioned on a rotational axis and co-axial with a de-spun portion, both the spun and de-spun portions each having a communication surface for interfacing with the other, and a central axial portion intermediate the spun and de-spun portions, the improvement comprising:

means for transmitting information in an optical signal from a part of a first communication surface positioned outside a central axial portion, the central axial portion having a rotational axis;

means for directing the optical signal through at least one communication path having an optical axis generally parallel to the rotational axis of the central axial portion and then onto a part of a second communication surface also positioned outside the central axial portion to thereby create a transmission path on a part of such communication surface entirely about the rotational axis, which transmission path is of a configuration described by a series of contiguous transmission paths; and means on the second communication surface for detecting the optical signal within the transmission path, which means includes a detection area of a size less than that of a transmission path and which remains at all times in optical communication with the optical signal being directed through the communication path.

2. The invention of claim 1 wherein the transmitting means transmits the optical signal from a plurality of defined transmitting areas on the first communication surface.

3. The invention of claim 2 wherein the number of communication paths is equal to the number of transmitting areas.

4. The invention of claim 1 wherein the transmission means transmits the optical signal from a single defined transmitting area, on the first communication surface, which covers less than an area 360° about the rotational axis.

5. The invention of claim 1 wherein each communication path is generally cone-shaped, the apex being at the transmitting area.

6. The invention of claim 5 wherein the communication paths overlap.

7. The invention of claim 1 wherein detector paths are elliptically shaped and overlaps.

8. The invention of claim 1 wherein each communication surface has a transmitter means, directing means, and detecting means.

9. An improved optical rotary joint having a relatively movable member positioned on a rotational axis and co-axial with a relatively stationary member, the movable member having a first communication surface interfacing with a second communication surface on the stationary member, and a central axial portion intermediate the two members, the improvement comprising:

a transmitter for transmitting information in the form of an optical signal from a part of the second communication surface outside the axial portion;

means for creating a plurality of diverging, optical communication paths through which the optical signal travels, the communication paths each having optical axes generally parallel to the rotational axis and positioned between the communication surfaces outside the axial portion to thereby create one continuous detection path about the rotational axis on a part of the first communication surface outside the axial portion, which detection path is of a configuration described by a series of elliptical shaped areas; and means on the first communication surface for detecting the optical signal transmitted through the communication paths, which means are disposed within the detection path and define only one discrete detecting area of a size less than that of the detection path and remains at all times in optical communication with the optical signal.

10. The invention of claim 9 wherein the transmitting means includes one light emitting diode.

11. The invention of claim 9 wherein the transmitting means includes one semiconductor laser.

12. The invention of claim 9 wherein the creating means comprises a plurality of beam splitters on the second communication surface outside the axial portion.

13. The invention of claim 12 wherein the beam splitters are disposed equidistant from one another radially at a radial distance from the rotational axis and circumferentially along a circumference defined by the radial distance.

14. The invention of claim 9 wherein the communication paths exist contemporaneously with one another.

15. The invention of claim 14 wherein the communication paths are positioned equidistant from one another about the rotational axis.

16. The invention of claim 15 wherein each communication path overlaps the adjacent communication path on either side thereof.

17. The invention of claim 16 wherein each communication path is cone-shaped with a generally elliptical shaped area having a major axis whose ends overlap at oblique angles the ends of the major axes of the adjacent elliptical areas.

18. The invention of claim 17 wherein the major axes lie generally tangent to the circumference of an imaginary circle outside the axial portion.

19. The invention of claim 18 wherein the elliptical shaped areas of the detection path are the elliptical shaped areas of the communication paths.

20. The invention of claim 19 wherein the detecting area is of a size less than that of any one elliptical shaped area of the detection path.

21. In a spacecraft having relative movable members positioned on a rotational axis and co-axial with each other, a first spacecraft member having a first communication surface interfacing with a second communication surface on a second spacecraft member, the respective communication surfaces being radially outward from a central axial portion of the respective spacecraft members, the improvement of an optical communication system comprising:

a transmitter for transmitting information in the form of an optical signal from a part of the second communication surface outside the axial portion;

means for creating a series of diverging, optical communication paths having a plurality of respective optical axes generally parallel to the rotational axis and positioned between the communication surfaces outside the axial portion to thereby create one continuous detection path about the rotational axis on a path of the first communication surface outside the axial portion, which detection path is of a configuration described by a series of contiguous shaped areas; and means on the first communication surface for detecting the optical signal transmitted in the optical communication path which means are disposed within the detection path and define a plurality of discrete detecting areas which are each of a size less than that of the detection path and remain at all times in optical communication with the optical communication path.

22. The invention of claim 21 wherein the transmitter comprises a light emitting diode.

23. The invention of claim 21 wherein the transmitter comprises a semiconductor laser.

24. The invention of claim 21 wherein the communication paths are cone-shaped with a generally elliptical shaped area having a major axis that lies tangent to a circumference of an imaginary circle outside the axial portion.

25. The invention of claim 21 wherein each elliptical shaped area of the detection path has a major axis whose ends intersect at oblique angles with the ends of the major axes of the immediately adjacent elliptical areas, the major axes lying tangent to a circumference of an imaginary circle outside the axial portion.

26. The invention of claim 21 wherein the detecting means includes a plurality of detectors, each detector having a detection area of a size less than any one elliptical shaped area in the detection path.

27. The invention of claim 26 wherein the detectors are positioned in the detection path at a radial distance from the rotational axis and circumferentially about the circumference defined by the radial distance so that as the spacecraft members rotate at least one detector is always in the communication path.

28. In a gimbal system having relative movable members positioned on a rotational axis and co-axial with each other, a first member having a first communication surface interfacing with a second communication surface on a second member, the respective communication surfaces being radially outward from an axial portion of the respective movable members, the improvement of an optical communication system comprising:

a transmitter for transmitting information in the form of an optical signal from a part of the second communication surface outside the axial portion;

means for creating a series of diverging, optical communication paths having a plurality of respective optical axes generally parallel to the rotational axis and positioned between the communication surfaces outside the axial portion to thereby create one continuous detection path about the rotational axis on a parth of the first communication surface outside the axial portion, which detection path is of a configuration described by a series of contiguous shaped areas; and means on the first communication surface for detecting the optical signal transmitted in the optical communication path which means are disposed within the detection path and define a plurality of discrete detecting areas which are each of a size less than that of the detection path and remain at all times in optical communication with the optical communication path.

29. The invention of claim 28 wherein the transmitter comprises a light emitting diode.

30. The invention of claim 28 wherein the transmitter comprises a semiconductor laser.

31. The invention of claim 28 wherein the communication paths are cone-shaped with a generally elliptical shaped area having a major axis that lies tangent to a circumference of an imaginary circle outside the axial portion.

32. The invention of claim 28 wherein each elliptical shaped area of the detection path has a major axis whose ends intersect at oblique angles with the ends of the major axes of the immediately adjacent elliptical areas, the major axes lying tangent to a circumference of an imaginary circle outside the axial portion.

33. The invention of claim 28 wherein the detecting means includes a plurality of detectors, each detector having a detection area of a size less than any one elliptical shaped area in the detection path.

34. The invention of claim 33 wherein the detectors are positioned in the detection path at a radial distance from the rotational axis and circumferentially about the circumference defined by the radial distance so that as the spacecraft members rotate at least one detector is always in the communication path.

* * * * *